UNITED STATES PATENT OFFICE.

AUGUSTE TIXIER AND CASIMIR TORTEL, OF PARIS, FRANCE, ASSIGNORS TO LES PRODUITS CHIMIQUE DE CROISSY (J. BASLER & CO.), OF PARIS, FRANCE.

EXTRACTION OF COPPER AND OTHER METALS FROM ROASTED PYRITES.

No. 875,012.   Specification of Letters Patent.   Patented Dec. 31, 1907.

Application filed August 31, 1906. Serial No. 332,355.

*To all whom it may concern:*

Be it known that we, AUGUSTE TIXIER and CASIMIR TORTEL, chemists, both of 82 Rue St. Lazare, Paris, France, have invented certain new and useful Improvements in the Extraction of Copper from Pyrites, of which the following is a specification.

The present invention relates to a new and improved process for the extraction of copper from iron pyrites.

The new process possesses the great advantage over the methods hitherto employed, that it effects the extraction of the copper by a selective action whereby the copper is dissolved, while the iron is substantially unattacked. It thus permits of a more complete extraction of the copper at a lower cost. It also extracts from the iron pyrites nearly the whole of the other foreign metals, such as lead, zinc, silver and the like which in many cases give rise to inconveniences in the metallurgy of iron.

The process consists in roasting the iron pyrites and thereafter treating them with nascent chlorin in a warm acid liquor, preferably at a temperature of about 70° to 80° C. The copper and other foreign metals are thereby dissolved, leaving the iron substantially unattacked and the liquors and washings worked up in the usual way.

Practically the following has been found to be the best mode of carrying out the invention, but it is only given by way of example, and may be varied considerably in details and in the generation of the chlorin.

The iron pyrites are roasted and mixed in a dry state with 2 to 5 per cent. of commercial chlorid of lime, or they are moistened after roasting with solutions of hypochlorites of alkalies or alkaline earths containing a like quantity of available chlorin. The mixed ore is then introduced into vats, where it is sprayed with dilute sulfuric or hydrochloric acid and warmed to keep the temperature at about 70° to 80° C. If lead is present in the ore it is preferable to employ hydrochloric acid. The reaction is allowed to proceed for 12 to 24 hours, the liquors then drawn off, and the residue washed with lukewarm dilute acid and then with water. The iron residues are then practically free from foreign metals. The raising of the temperature is essential for the attainment of the selective action of the chlorin as mentioned.

What we claim and desire to secure by Letters Patent is:—

1. Method or process for the extraction of copper from iron pyrites, comprising roasting of the pyrites and treatment of the roasted pyrites with nascent chlorin in a warm acid liquor, whereby the copper is separated and the iron is substantially unattacked.

2. Method or process for the extraction of copper from iron pyrites, comprising roasting of the pyrites and treatment of the roasted pyrites with nascent chlorin in an acid liquor at a temperature of about 70° to 80° C., whereby the copper is separated and the iron is substantially unattacked.

3. Method or process for the extraction of copper from iron pyrites, comprising roasting of the pyrites, and treatment of the roasted pyrites at a temperature of about 70° to 80° C. with a mineral acid, as hydrochloric acid, in the presence of an alkali compound capable of liberating chlorin under the action of the acid, whereby the copper is separated and the iron is substantially unattacked.

In witness whereof, we have hereunto signed our names in the presence of two subscribing witnesses.

AUGUSTE TIXIER.
CASIMIR TORTEL.

Witnesses:
JOSEPH SIMSON,
HANSON C. COXE